(12) United States Patent
Chen et al.

(10) Patent No.: US 10,743,294 B2
(45) Date of Patent: *Aug. 11, 2020

(54) TECHNIQUES FOR WIRELESS COMMUNICATIONS USING A MODIFIED SUBFRAME STRUCTURE

(71) Applicant: QUALCOMM Incorporated, San Diego, CA (US)

(72) Inventors: Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/276,201

(22) Filed: Feb. 14, 2019

(65) Prior Publication Data

US 2019/0182818 A1   Jun. 13, 2019

Related U.S. Application Data

(63) Continuation of application No. 15/239,192, filed on Aug. 17, 2016, now Pat. No. 10,244,510.
(Continued)

(51) Int. Cl.
*H04W 72/04* (2009.01)
*H04L 5/00* (2006.01)
(Continued)

(52) U.S. Cl.
CPC ....... *H04W 72/0406* (2013.01); *H04L 5/0007* (2013.01); *H04L 5/0044* (2013.01);
(Continued)

(58) Field of Classification Search
CPC ......... H04W 72/0406; H04W 72/0446; H04W 72/1231; H04W 74/0808; H04L 5/0007;
(Continued)

(56) References Cited

U.S. PATENT DOCUMENTS

| 10,244,510 B2 | 3/2019 | Chen et al. |
| 2012/0093009 A1 | 4/2012 | Wang et al. |

(Continued)

FOREIGN PATENT DOCUMENTS

| WO | WO-2010015206 A1 | 2/2010 |
| WO | WO-2014110692 A1 | 7/2014 |

OTHER PUBLICATIONS

International Search Report and Written Opinion—PCT/US2016/047613—ISA/EPO—dated Oct. 13, 2016.
(Continued)

*Primary Examiner* — Paul H Masur
(74) *Attorney, Agent, or Firm* — Arent Fox, LLP and Qualcomm, Incorporated

(57) ABSTRACT

A modified subframe structure is defined for a subset of a plurality of subframes. The modified subframe structure includes a first portion with one or more blank symbols over which a network node can measure monitor to determine whether the subframe is used as a downlink (or uplink) subframe by a neighboring network node. The modified subframe structure can also include a second portion of symbols for communicating control information or data in the subframe, which can be based on determining whether the subframe is used as a downlink (or uplink) subframe by the neighboring network node. This can lessen the impact of possible interference caused by the network nodes dynamically switching time division duplexing (TDD) subframe configurations by enabling network nodes to determine when a neighboring node is transmitting in a subframe, and accordingly avoiding transmitting in the subframe.

30 Claims, 6 Drawing Sheets

Related U.S. Application Data

(60) Provisional application No. 62/232,970, filed on Sep. 25, 2015.

(51) Int. Cl.

| | | |
|---|---|---|
| *H04L 5/14* | (2006.01) | |
| *H04W 74/08* | (2009.01) | |
| *H04W 72/12* | (2009.01) | |
| *H04W 88/02* | (2009.01) | |

(52) U.S. Cl.
CPC .......... *H04L 5/0048* (2013.01); *H04L 5/0053* (2013.01); *H04L 5/14* (2013.01); *H04L 5/1469* (2013.01); *H04W 72/0446* (2013.01); *H04W 72/1231* (2013.01); *H04W 74/0808* (2013.01); *H04L 5/0073* (2013.01); *H04W 88/02* (2013.01)

(58) Field of Classification Search
CPC ... H04L 5/0044; H04L 5/0048; H04L 5/0053; H04L 5/0073; H04L 5/14; H04L 5/1469
See application file for complete search history.

(56) References Cited

U.S. PATENT DOCUMENTS

| | | | | |
|---|---|---|---|---|
| 2014/0293844 A1* | 10/2014 | Meng | .................... | H04L 5/1438 370/280 |
| 2014/0341018 A1 | 11/2014 | Bhushan et al. | | |
| 2014/0341051 A1 | 11/2014 | Gaal et al. | | |
| 2015/0043392 A1* | 2/2015 | Susitaival | ............. | H04L 5/1469 370/280 |
| 2015/0215761 A1* | 7/2015 | Chen | .................. | H04W 56/001 370/255 |
| 2015/0263837 A1 | 9/2015 | Patel et al. | | |
| 2015/0271798 A1* | 9/2015 | Chen | .................... | H04L 1/1812 370/329 |
| 2015/0350944 A1* | 12/2015 | Chen | ....................... | H04L 43/08 370/252 |
| 2016/0029396 A1 | 1/2016 | Feng et al. | | |
| 2016/0044663 A1 | 2/2016 | Yao et al. | | |
| 2016/0157248 A1 | 6/2016 | Jiezhen et al. | | |
| 2017/0012727 A1* | 1/2017 | Yasukawa | ......... | H04W 72/1289 |

OTHER PUBLICATIONS

Qualcomm Incorporated: "Required Functionalities and Design Targets", 3GPP Draft; R1-143999, 3rd Generation Partnership Project (3GPP), Mobile Competence Centre ; 650, Route Des Lucioles ; F-06921 Sophia-Antipolis Cedex ; FRAN vol. RAN WG1, No. Ljubljana, Slovenia; Oct. 6, 2014-Oct. 10, 2014, Sep. 27, 2014 (Sep. 27, 2014), XP050869664, 4 pages. URL: http://www.3gpp.org/ftp/tsg_ran/WG1_RL1/TSGR1_78b/Docs/ [retrieved on Sep. 27, 2014].

Qualcomm Incorporated: "Solutions for Required Functionalities and Design Targets", 3GPP Draft; 3GPP TSG-RAN WG1#78bis, R1-144000, Solutions for Required Functionalities and Design Targets, 3rd Generation Partnership Project (3GPP), Mobile Competence Centre; 650, Route Des Lucioles; F-06921 Sophia-Antipoli vol. RAN WG1, No. Ljubljana, Slovenia; Oct. 6, 2014-Oct. 10, 2014, Sep. 27, 2014 (Sep. 27, 2014), XP050869665, 5 pages, Retrieved from the Internet: URL:http://www.3gpp.org/ftp/tsg_ran/WG1_RL1/TSGR1_78b/Docs/R1-144000.zip [retrieved on Sep. 27, 2014].

Taiwan Search Report—TW105126611—TIPO—dated Jan. 15, 2020.

* cited by examiner

TECHNIQUES FOR WIRELESS COMMUNICATIONS USING A MODIFIED SUBFRAME STRUCTURE

CLAIM OF PRIORITY UNDER 35 U.S.C. § 119

This application is a Continuation of U.S. patent application Ser. No. 15/239,192 entitled "TECHNIQUES FOR WIRELESS COMMUNICATIONS USING A MODIFIED SUBFRAME STRUCTURE" filed Aug. 17, 2016, which claims priority to Provisional Application No. 62/232,970 entitled "TECHNIQUES FOR WIRELESS COMMUNICATIONS USING A MODIFIED SUBFRAME STRUCTURE" filed Sep. 25, 2015, which are assigned to the assignee hereof and hereby expressly incorporated by reference herein for all purposes.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple user equipment devices (UE). Each UE communicates with one or more base stations, such as an evolved Node B (eNB) via transmissions on the forward and reverse links. The forward link (or downlink) refers to the communication link from the eNBs to the UEs, and the reverse link (or uplink) refers to the communication link from the UEs to the eNBs. This communication link may be established via a single-in-single-out, multiple-in-single-out or a multiple-in-multiple-out (MIMO) system. In this regard, the UEs can access wireless network via one or more eNBs.

In LTE, both frequency division duplexing (FDD) and time division duplexing (TDD) are supported, and devices can utilize one of multiple subframe configurations in communicating using TDD where a subframe configuration defines which subframes of a frame are for downlink communications, which subframes of the frame are for uplink communications, which subframes of the frame are special subframes for switching from downlink to uplink communications, etc. In recent LTE development, it is possible to dynamically adapt a TDD subframe configuration based on actual traffic needs, which is known as enhanced interference mitigation for traffic adaptation (eIMTA). An evolved Node B (eNB) in LTE, for example, can indicate a modified subframe configuration to a group of one or more served UEs in layer 1 signaling. This dynamic switching, however, may result in interference between neighboring cells, where the neighboring cells frequently switch between having conforming downlink/uplink communications (i.e., the same subframes in neighboring cells are configured for downlink or configured for uplink) to subframes configured for non-conforming downlink/uplink communications (i.e., the same subframes in neighboring cells are configured to communicate in different directions).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A modified subframe structure is defined for a subset of a plurality of subframes. The modified subframe structure includes a first portion with one or more blank symbols over which a network node can monitor to determine whether the subframe is used as a downlink (or uplink) subframe by a neighboring network node. The modified subframe structure can also include a second portion of symbols for communicating control information or data in the subframe, which can be based on determining whether the subframe is used as a downlink (or uplink) subframe by the neighboring network node. This can lessen the impact of possible interference caused by the network nodes dynamically switching time division duplexing (TDD) subframe configurations by enabling network nodes to determine when a neighboring node is transmitting in a subframe, and accordingly avoiding transmitting in the subframe.

According to an example, a method for determining a subframe configuration in wireless communications in a first node is provided, which can be performed by an evolved NodeB (eNB), user equipment (UE), or substantially any node capable of communicating in a wireless network. The method includes determining a subset of subframes, in a plurality of subframes, associated with a modified subframe structure, wherein the modified subframe structure includes a first portion with one or more blank symbols and a second portion of symbols for communicating at least one of control information or data, and communicating control information or data with a second node based on the modified subframe structure using at least one subframe in the subset of subframes.

In another example, an apparatus for determining a subframe configuration in wireless communications in a first node is provided. The apparatus includes a transceiver, one or more antennas, at least one processor communicatively coupled with the transceiver via a bus for communicating signals in a wireless network via the one or more antennas, and a memory communicatively coupled with the at least one processor and/or the transceiver via the bus. The at least one processor is configured to determine a subset of subframes, in a plurality of subframes, associated with a modified subframe structure, wherein the modified subframe structure includes a first portion with one or more blank symbols and a second portion of symbols for communicating at least one of control information or data, and communicate, via the transceiver, control information or data with a second node based on the modified subframe structure using at least one subframe in the subset of subframes.

In yet another example, an apparatus for determining a subframe configuration in wireless communications in a first node is provided. The apparatus includes means for determining a subset of subframes, in a plurality of subframes, associated with a modified subframe structure, wherein the modified subframe structure includes a first portion with one or more blank symbols and a second portion of symbols for communicating at least one of control information or data. The apparatus also includes means for communicating control information or data with a second node based on the modified subframe structure using at least one subframe in the subset of subframes.

In another example, a computer-readable storage medium including computer-executable code for determining a subframe configuration in wireless communications in a first node is provided. The code includes code for determining a subset of subframes, in a plurality of subframes, associated with a modified subframe structure, wherein the modified subframe structure includes a first portion with one or more blank symbols and a second portion of symbols for communicating at least one of control information or data, as well as code for communicating control information or data with a second node based on the modified subframe structure using at least one subframe in the subset of subframes.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
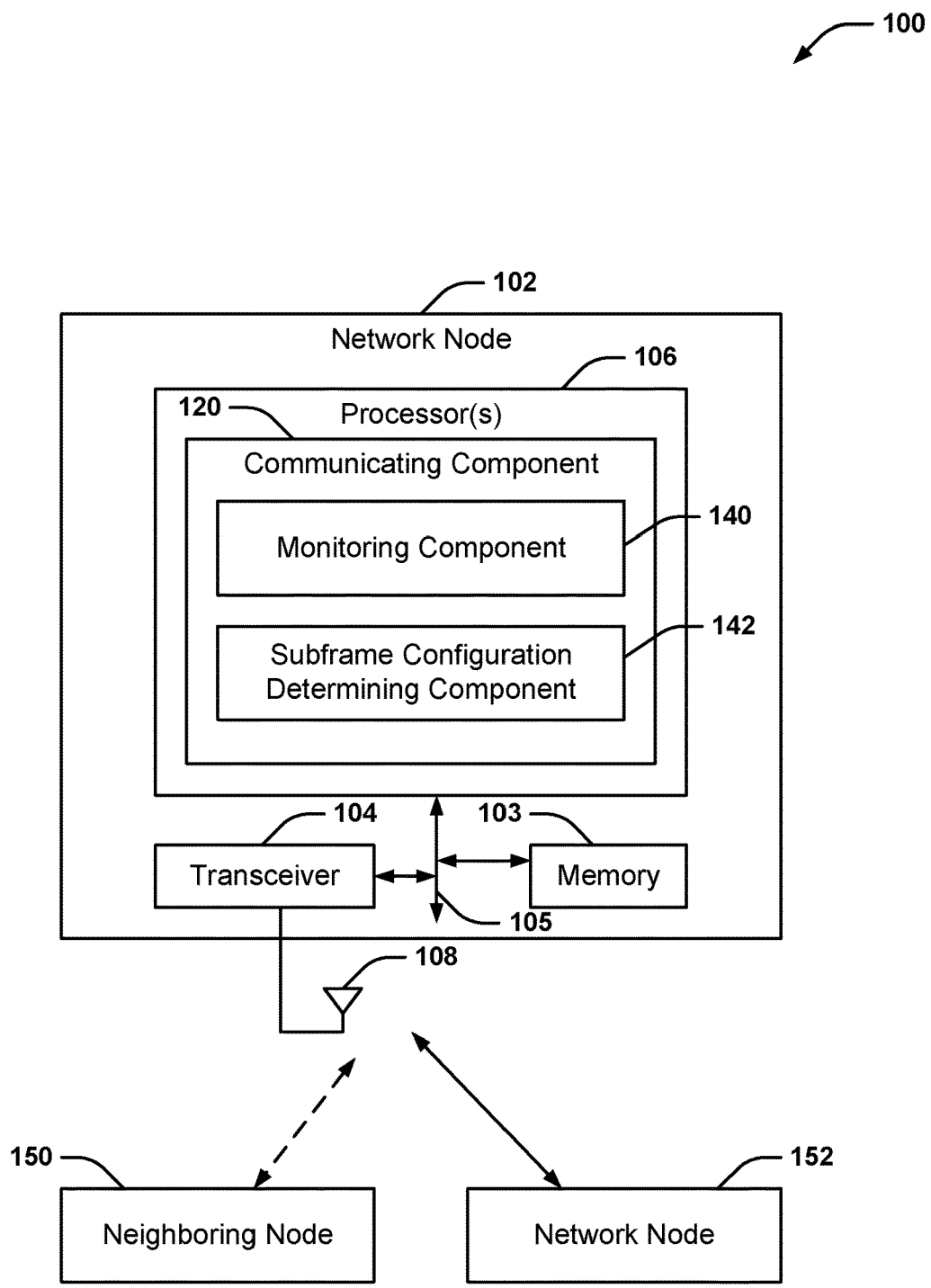
FIG. 1 illustrates an example of a system for communicating in a wireless network based on a modified subframe structure in accordance with aspects described herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Described herein are various aspects related to utilizing a modified subframe structure in communicating between network nodes. The modified subframe structure can be modified from a conventional subframe structure, where the conventional subframe structure can be configured for one type of communication (e.g., downlink or uplink) over the whole subframe. For example, the modified subframe structure can include a first portion (e.g., of one or more blank symbols) for monitoring communications from neighboring network nodes and a second portion (e.g., of one or more remaining symbols) for communicating control information or data. Symbols, as referred to herein, can correspond to a portion of the subframe, such as one or more orthogonal frequency division multiplexing (OFDM) symbols, single carrier frequency division multiplexing (SC-FDM) symbols, etc. in the subframe. For example, one or more of the network nodes can monitor communications from neighboring network nodes during the first portion of the subframe, and can determine a subframe configuration used by one or more neighboring network nodes for at least the subframe based on the monitoring. For example, the determined subframe configuration can relate to whether the subframe is configured for downlink communications, uplink communications, or is a special subframe during which communications are switched from downlink to uplink in time division duplexing (TDD). Special subframes can be considered to be downlink subframes in one or more examples described herein. The network node can accordingly communicate with other network nodes based on the subframe configuration so as not to interfere with communications by the neighboring network nodes.

For example, in a configured downlink subframe, an evolved Node B (eNB) can monitor for signals from user equipment (UEs) communicating with neighboring eNBs during the first portion (e.g., one or more blank symbols) in the subframe to determine whether the subframe is configured for uplink communications by one or more of the neighboring eNBs. Where one or more uplink signals are detected from one or more UEs for the neighboring eNBs (or downlink signals from the neighboring eNBs are not detected), the eNB can determine the subframe is being used by the neighbor cell as an uplink subframe, and can accordingly refrain from transmitting communications to one or more served UEs in a remaining portion of the subframe to avoid generating interference for the neighbor eNB on the uplink. Where one or more uplink signals are not detected from one or more UEs for the neighboring eNBs (or downlink signals from the neighboring eNBs are detected), the eNB can determine the subframe is a downlink subframe, and can accordingly transmit communications to the one or more served UEs in a remaining portion of the subframe.

In another example, a UE can monitor for signals from one or more neighboring eNBs (and/or one or more UEs) during the first portion, and where signals from the neighboring eNBs are detected (and/or signals from the UEs are not detected), the UE can determine the subframe is a downlink subframe at the neighboring eNB(s), and can accordingly refrain from transmitting communications to a serving eNB so as not to interfere with or receive interference from signals transmitted by the neighboring eNB(s). Similarly, for example, where the UE does not detect signals from the neighboring eNB(s) (and/or detects signals from one or more UEs communicating with neighboring eNBs) during the first portion, the UE can determine the subframe is an uplink subframe at the neighboring eNB(s) and can accordingly transmit uplink communications (e.g., if scheduled) to its serving eNB.

The network nodes can communicate according to the modified subframe structure in a subset of subframes for a given plurality of subframes (e.g., in a frame), such to mitigate impact of the modified subframe structure caused to communications of the network nodes. For instance, an eNB that dynamically adapts a subframe configuration (e.g., to provide multicast functionality in multicast-broadcast single-frequency network (MBSFN), based on traffic needs in enhanced interference mitigation for traffic adaptation (eIMTA), etc.) can communicate according to the modified subframe structure in the subset of subframes that are not of the same configuration between the dynamically adapted subframe configuration and a subframe configuration indicated in system information block (SIB) broadcasted by the eNB.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, user equipment, or user equipment device. A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, access node, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (WiFi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN (WLAN), BLUETOOTH and any other short- or long-range, wireless communication techniques.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Figure 2:
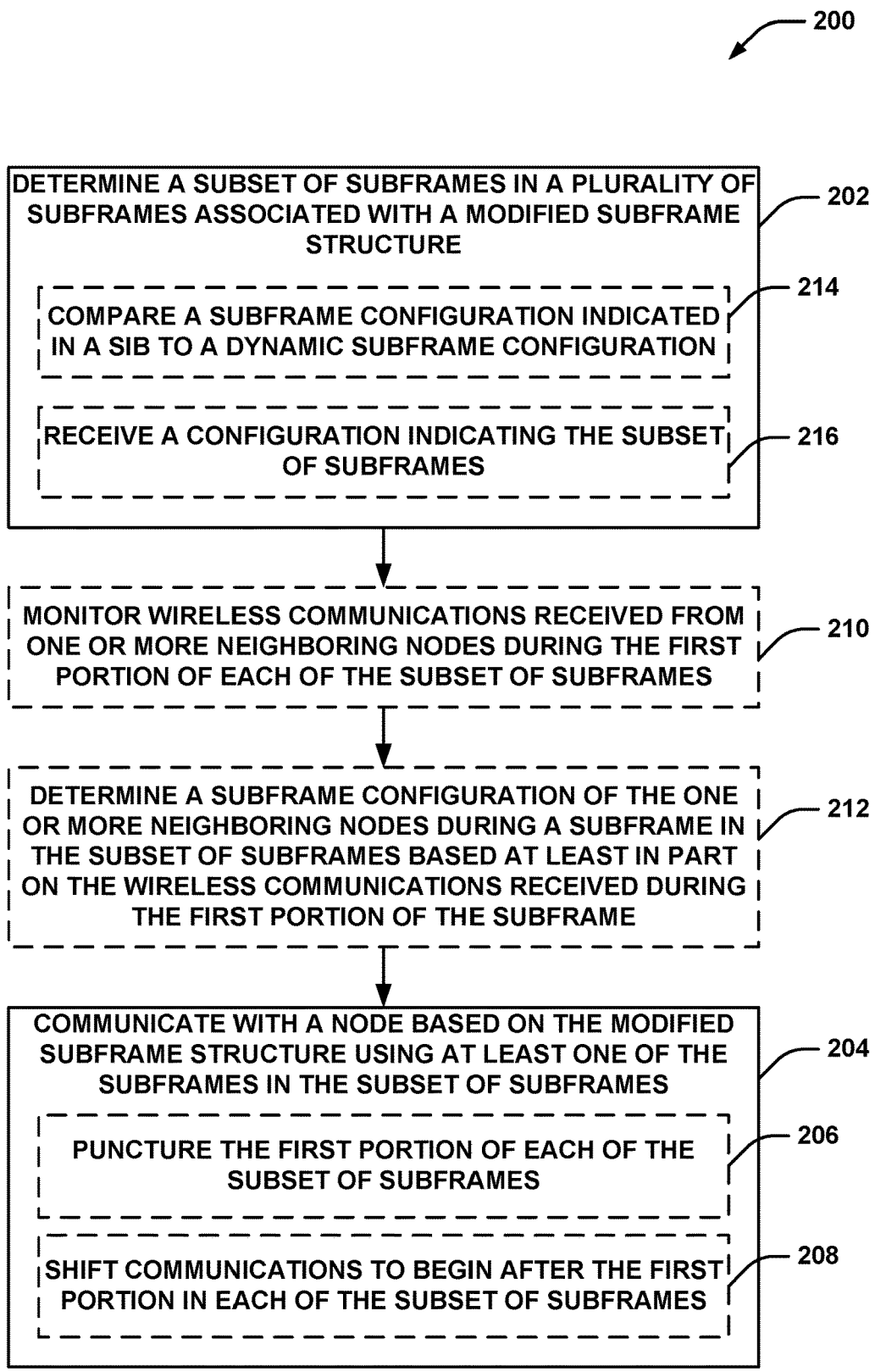
FIG. 2 illustrates an example of a method for communicating in a wireless network based on a modified subframe structure in accordance with aspects described herein.

In FIGS. 1-2, aspects are depicted with reference to one or more components and one or more methods that may perform the actions or operations described herein, where aspects in dashed line may be optional. Although the operations described below in FIG. 2 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

FIG. 1 depicts an example of a system 100 for communicating in a wireless network according to a modified subframe structure described herein. System 100 includes a network node 102 that communicates with another network node 152 in a wireless network. In an aspect, network node 102 can be an eNB that may have established one or more downlink channels with network node 152, which can be a UE, over which downlink signals can be transmitted by network node 102 (e.g., via transceiver 104 utilizing one or more antennas 108) and received by network node 152 for communicating control information and/or data (e.g., signaling) over configured communication resources. Moreover, for example, network node 102 may have established one or more uplink channels with the network node 152 over which uplink signals can be transmitted by the network node 152 and received by network node 102 (e.g., via transceiver 104 over one or more antennas 108) for communicating control information and/or data (e.g., signaling) over configured communication resources. In another example, network node 102 can be a UE, and network node 152 can be an eNB, network nodes 102 and 152 can be peer-to-peer devices configured to communicate with one another, etc. In an example, network nodes 102 and 152 may communicate according to a TDD subframe configuration, which can be configured by one of the network nodes 102, 152 and indicated to the other network node 102, 152 (e.g., in a SIB, in a semi-static configuration via higher layer signaling, in a control channel indicating eIMTA configuration, etc.).

In an aspect, network node 102 may include one or more processors 106 and/or a memory 103 that may be communicatively coupled, e.g., via one or more buses 105, and may operate in conjunction with or otherwise implement a communicating component 120 for communicating with a network node 152 according to a modified subframe structure. For example, the various operations related to communicating component 120 may be implemented or otherwise executed by one or more processors 106 and, in an aspect, can be executed by a single processor, while in other aspects, different ones of the operations may be executed by a combination of two or more different processors. For example, in an aspect, the one or more processors 106 may include any one or any combination of a modem processor, or a baseband processor, or a digital signal processor, or an application specific integrated circuit (ASIC), or a transmit processor, or a transceiver processor associated with transceiver 104. Further, for example, the memory 103 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 106. Moreover, memory 103 or computer-readable storage medium may be resident in the one or more processors 106, external to the one or more processors 106, distributed across multiple entities including the one or more processors 106, etc.

In particular, the one or more processors 106 and/or memory 103 may execute actions or operations defined by communicating component 120 or its subcomponents. For instance, the one or more processors 106 and/or memory 103 may execute actions or operations defined by a monitoring component 140 for monitoring for wireless communications during a portion of a subframe having a modified subframe structure. In an aspect, for example, monitoring component 140 may include hardware (e.g., one or more processor modules of the one or more processors 106) and/or computer-readable code or instructions stored in memory 103 and executable by at least one of the one or more processors 106 to perform the specially configured wireless communication monitoring operations described herein. Further, for instance, the one or more processors 106 and/or memory 103 may execute actions or operations defined by a subframe configuration determining component 142 for determining whether a subframe is configured for uplink or downlink communications by one or more neighboring network nodes. In an aspect, for example, subframe configuration determining component 142 may include hardware (e.g., one or more processor modules of the one or more processors 106) and/or computer-readable code or instructions stored in memory 103 and executable by at least one of the one or more processors 106 to perform the specially configured subframe configuration determining operations described herein.

In an example, transceiver 104 may be configured to transmit and receive wireless signals through one or more antennas 108, using one or more RF front end components (e.g., power amplifiers, low-noise amplifiers, filters, digital-to-analog converters, analog-to-digital converters, etc.), one or more transmitters or associated processors, one or more receivers or associated processors (not shown). In an aspect, transceiver 104 may be tuned to operate at specified frequencies such that network node 102 can communicate at a certain frequency via one or more antennas 108 to transmit and/or receive wireless signals. In an aspect, the one or more processors 106 may configure transceiver 104 to operate at a specified frequency and power level based on a configuration, a communication protocol, etc.

In an aspect, transceiver 104 can operate in multiple bands (e.g., using a multiband-multimode modem, not shown) such to process digital data sent and received using transceiver 104. In an aspect, transceiver 104 can be multiband and be configured to support multiple frequency bands for a specific communications protocol. In an aspect, transceiver 104 can be configured to support multiple operating networks and communications protocols. Thus, for example, transceiver 104 may enable transmission and/or reception of signals based on a specified modem configuration.

In addition, for example, network node 152 may include one or more similar components as network node 102 to facilitate communicating in the wireless network and/or monitoring for communications during the subset of subframes according to the modified subframe structure, as described herein, though such components may be omitted from FIG. 1 for ease of explanation.

Referring to FIG. 2, an example of a method 200 is illustrated for communicating (e.g., by a network node 102 operating a communicating component 120) according to a modified subframe structure in a subset of subframes. In method 200, blocks indicated as dashed boxes represent optional steps.

Method 200 includes, at Block 202, determining a subset of subframes, in a plurality of frames, associated with a modified subframe structure. In an aspect, communicating component 120 (FIG. 1), e.g., in conjunction with processor(s) 106, memory 103, and/or transceiver 104, can determine the subset of subframes, in the plurality of frames, associated with the modified subframe structure. For example, the modified subframe structure can include a first portion, such as a fraction of a symbol, one or more symbols, etc., that are blanked to facilitate monitoring for wireless communications from neighboring network nodes (e.g., neighboring node 150 in FIG. 1) during the first portion. For example, blanked symbols can refer to symbols over which communications are not transmitted (or received), where communicating component 120 can cancel communications that may have been scheduled over the symbols, refrain from scheduling communication on symbols in the symbols, deactivate transmitter resources over the symbols, etc. For example, the first portion (e.g., the one or more blanked symbols) may include a single symbol, a contiguous plurality of symbols, or a non-contiguous plurality of symbols, where the one or more blank symbols may be at substantially any symbol index within the subframe. The modified subframe structure can also include a second portion (e.g., the remaining symbols) over which control information and/or data can be communicated. For example, the modified subframe structure can be present in a subset of subframes of a plurality of subframes (e.g., a subset of subframes during one or more frames).

Method 200 also includes, at Block 204, communicating with a node based on the modified subframe structure using at least one of the subframes in the subset of subframes. In an aspect, communicating component 120, e.g., in conjunction with processor(s) 106, memory 103, and/or transceiver 104, can communicate with the node (e.g., network node 152) based on the modified subframe structure using at least one of the subframes in the subset of subframes. Thus, for example, communicating component 120 can transmit communications (e.g., wireless signals via one or more antennas 108) to network node 152 (or receive communications from network node 152 via one or more antennas 108) in the second portion of the subframe without transmitting during the first portion of the subframe. As described herein, this can allow for monitoring communications in the first portion of the subframe to determine whether and/or how to communicate in the second portion of the subframe.

In an example, communicating with the node at Block 204 may optionally include, at Block 206, puncturing the first portion of each of the subset of subframes. In an aspect, communicating component 120, e.g., in conjunction with processor(s) 106, memory 103, and/or transceiver 104, can puncture the first portion of each of the subset of subframes. For example, puncturing can refer to cancelling communications during the first portion of each of the subset of subframes (e.g., not transmitting or receiving communications to/from one or more network nodes, such as network node 152). Puncturing, in this regard, can result in the first portion of each of the subset of subframes being blanked such that communicating component 120 does not communicate over the first portion, which may include communicating component 120 cancelling communications that may have been scheduled over the first portion or otherwise refraining from transmitting such communications. Thus, the first portion can be reserved for monitoring wireless communications from neighboring network nodes (e.g., neighboring node 150), as described further herein. Moreover, in an example, the first portion can include a first symbol in the subframe that can be punctured (e.g., blanked) for monitoring, as described further in reference to FIG. 3.

In a specific example, where network node 102 is an eNB and where a first symbol in a subframe is punctured, a cell-specific reference signal (CRS) may be punctured and thus not transmitted in the first symbol of the subframe. In addition, legacy control channels in the first symbol may be punctured. In this example, in communicating with the node based on the modified subframe structure (e.g., at Block 204), network node 102 may transmit control data in a control portion of another symbol of the subframe, such as in symbols associated with a legacy control region, such as the next one or two symbols, in an enhanced physical downlink control channel (EPDCCH) defined in the second portion of the subframe, etc.

In another example, communicating with the node at Block 204 may optionally include, at Block 208, shifting communications to begin after the first portion in each of the subset of subframes. In an aspect, communicating component 120, e.g., in conjunction with processor(s) 106, memory 103, and/or transceiver 104, can shift communications to begin after the first portion in each of the subset of subframes. For example, communications scheduled for the first one or more symbols in the first portion of the subframe can be shifted to begin at the first one or more symbols in the second portion of the subframe. This may result in the one or more last symbols of the subframe being punctured (e.g., not transmitted due to replacing the last symbols with prior symbols). Thus, the first portion can be reserved for monitoring wireless communications from neighboring network nodes (e.g., neighboring node 150), as described further herein. Moreover, in an example, the first portion can include a first symbol in the subframe that can be punctured (e.g., blanked) for monitoring, as described further in reference to FIG. 3.

In a specific example, where network node 102 is an eNB, shifting the communications in this regard can allow for transmission of a CRS in the first symbol of the second portion of the subframe. In this example, however, a demodulation reference signal (DM-RS) and/or UE-specific reference signal (UE-RS) designed for a regular downlink subframe (e.g., as defined in LTE) may not be applicable as it may be scheduled in a punctured last symbol of the subframe. Thus, in an example, communicating component 120 can transmit the DM-RS (and/or UE-RS) using a pattern defined in other subframe structures, e.g., in the symbols that map to the second portion of the subframe (e.g., using a pattern defined in downlink pilot time slot (DwPTS)).

After determining the subset of subframes associated with the modified frame structure, method 200 may optionally include, at Block 210, monitoring wireless communications received from one or more neighboring nodes during the first portion of each of the subset of subframes. In an aspect, monitoring component 140, e.g., in conjunction with processor(s) 106, memory 103, and/or transceiver 104, can monitor wireless communications received (e.g., as wireless signals via one or more antennas 108) from the one or more neighboring nodes (e.g., neighboring node 150) during the first portion of each of the subset of subframes. For example, monitoring component 140 can monitor wireless communications (e.g., for one or more signals received via one or more antennas 108) from the one or more neighboring nodes on the same frequency as network node 102 operates to communicate with network node 152. In another example, monitoring component 140 can monitor wireless communications (e.g., for one or more signals received via one or more antennas 108) on an adjacent frequency to the frequency over which the network node 102 communicates with network node 152. This can include an adjacent frequency channel that is adjacent in frequency to a serving frequency channel over which the network node 102 communicates with network node 152, for example. Similarly, for example, monitoring component 140 can monitor wireless communications (e.g., for one or more signals received via one or more antennas 108) on substantially any frequency channel that may be subject to interference by or cause interference on the monitored frequency. Analyzing communications received in monitoring during the first portion of each of the subset of subframes can facilitate determining whether the subframe is used for uplink or downlink communications by the neighboring node 150 and/or a corresponding node serving the neighboring node, and communicating component 120 can accordingly communicate with network node 152 based on determining whether the subframe is used for uplink or downlink communications by the neighboring node 150.

Thus, in an example, method 200 may also optionally include, at Block 212, determining a subframe configuration of the one or more neighboring nodes during a subframe in the subset of subframes based at least in part on the wireless communications received during the first portion of the subframe. In an aspect, subframe configuration determining component 142, e.g., in conjunction with processor(s) 106, memory 103, and/or transceiver 104, can determine the subframe configuration of the one or more neighboring nodes (e.g., neighboring node 150) during the subframe in the subset of subframes based at least part on the wireless communications received (or not received) during the first portion of the subframe. For example, subframe configuration determining component 142 can determine whether the communications received during the first portion of the subframe achieve an interference threshold, and may accordingly determine the subframe configuration based on whether the communications achieve the interference threshold. For example, the interference threshold may be configured in memory 103 of the network node 102, by a configuration from network node 152 or other component of a wireless network, etc. As described, communicating with the node at Block 204 (by communicating component 120) may be based on determining the subframe configuration, and thus the network node 102 can adapt its subframe configuration to that determined of the one or more neighboring nodes. As another example, subframe configuration determining component 142 can determine the subframe configuration of the one or more neighboring nodes (e.g., neighboring node 150) during the subframe in the subset of subframes via a backhaul communication between network node 102 and network node 152. The backhaul communication may indicate an intended subframe configuration for one or more subframes in the subset of subframes.

For example, where network node 102 is an eNB, monitoring component 140 can monitor wireless communications in the first portion of a subframe (according to the modified subframe structure) for communications related to a neighboring node 150 (e.g., uplink communications transmitted by the neighboring node 150 to a serving eNB where neighboring node 150 is a UE, downlink communications transmitted by the neighboring node 150 where neighboring node 150 is an eNB, etc.). Monitoring component 140 can monitor the wireless communications in a subset of subframes that correspond to downlink subframes at network node 102. Where monitoring component 140 receives wireless communications during the first portion of the subframe (e.g., via one or more antennas 108), subframe configuration determining component 142 can determine whether the subframe is configured as a downlink subframe for the neighboring node 150, which can be based on detecting one or more downlink signals from neighboring node 150 during the first portion (e.g., signals determined to be downlink signals based on a signal power or a received energy of the signals achieving the interference threshold, a frequency band of the signal, a structure of the signal, detecting the signals as a CRS, etc.). Where subframe configuration determining component 142 determines the subframe is configured as a downlink subframe for neighboring node 150, communicating component 120 can transmit downlink communications to network node 152 in the second portion of the subframe.

In another example, where monitoring component 140 receives wireless communications during the first portion of the subframe (e.g., via one or more antennas 108), subframe configuration determining component 142 can determine whether the subframe is configured as an uplink subframe for the neighboring node 150, which can be based on detecting one or more uplink signals from neighboring node 150 during the first portion (e.g., signals determined to be uplink signals based on a signal power or a received energy of the signals achieving the interference threshold, a frequency band of the signals, a structure of the signals, etc.). Where subframe configuration determining component 142 determines the subframe is configured as an uplink subframe for neighboring node 150, communicating component 120 can refrain from transmitting downlink communications to network node 152 in the second portion of the subframe so as not to interfere with the uplink communications of the neighboring node 150 or have downlink transmissions of the network node 102 interfered by uplink communications of the neighboring node 150. In another example, subframe configuration determining component 142 can determine a subframe configuration where monitoring component 140 does not receive wireless communications in the subframe (e.g., monitoring component 140 can assume the subframe is configured for uplink communications where no downlink communications are detected in the first portion of the subframe).

For example, where network node 102 is a UE, monitoring component 140 can similarly monitor wireless communications in the first portion of a subframe (according to the modified subframe structure) for communications related to a neighboring node 150 (e.g., uplink communications transmitted by the neighboring node 150 to a serving eNB where neighboring node 150 is a UE, downlink communications transmitted by the neighboring node 150 where neighboring node 150 is an eNB, etc.). Monitoring component 140 can monitor the wireless communications in a subset of subframes that correspond to uplink subframes at network node 102. Where monitoring component 140 detects wireless communications during the first portion of the subframe (e.g., received by one or more antennas 108), subframe configuration determining component 142 can determine whether the subframe is configured as a downlink subframe for the neighboring node 150, which can be based on detecting one or more downlink signals from neighboring node 150 during the first portion (e.g., signals determined to be downlink signals based on a signal power or a received energy of the signals achieving the interference threshold, a frequency band of the signals, a structure of the signals, detecting the signals as a CRS, etc.). Where subframe configuration determining component 142 determines the subframe is configured as a downlink subframe for neighboring node 150, communicating component 120 can refrain from transmitting uplink communications to network node 152 in the second portion of the subframe so as not to interfere with downlink transmissions of the neighboring node 150 and/or have uplink transmissions by network node 102 interfered by downlink transmissions of the neighboring node 150.

In another example, where monitoring component 140 detected wireless communications during the first portion of the subframe (e.g., via one or more antennas 108), subframe configuration determining component 142 can determine whether the subframe is configured as an uplink subframe for the neighboring node 150, which can be based on detecting one or more uplink signals from neighboring node 150 during the first portion (e.g., signals determined to be uplink signals based on a signal power or a received energy of the signals achieving the interference threshold, a frequency band of the signals, a structure of the signals, etc.). Where subframe configuration determining component 142 determines the subframe is configured as an uplink subframe for neighboring node 150, communicating component 120 can transmit uplink communications to network node 152 in the second portion of the subframe.

In addition, where network node 102 is a UE, there may be a gap in timing between uplink transmission and downlink reception at network node 102 due to a configured timing advance for transmitting the uplink communications. For example, the timing advance, which can be configured at a serving eNB, can be around twice the propagation delay between the network node 102 and the serving eNB (e.g., network node 152). The timing gap between the uplink transmission and receiving downlink signals from neighboring nodes (e.g., neighboring node 150) may be larger as the network node 102 may be in closer proximity to, or otherwise have less propagation delay to, network node 152. In addition, in macrocell deployments (e.g., where network node 152 and/or neighboring node 150 are macrocells), the gap may be even larger. Thus, in some cases, it is possible that the network node 102 may not be able to monitor for wireless communications from neighboring node 150 in time to transmit uplink communications to network node 152. Thus, in an example, monitoring component 140 can monitor for wireless communications for a maximum timing duration after which monitoring component 140 can cease monitoring, and communicating component 120 may or may not transmit uplink communications over the second portion of the subframe. For example, the maximum timing duration may be configured in memory 103 of the network node 102, by a configuration from network node 152 or other component of a wireless network, etc.

In another example, in monitoring wireless communications at Block 210, monitoring component 140 can monitor for wireless communications according to an interference threshold, and where received communications achieve the interference threshold, communicating component 120 may or may not transmit uplink communications over the second portion of the subframe. In an example, communicating component 120 may only refrain from transmitting uplink communications over the second portion of the subframe where the monitored wireless communications achieve the interference threshold. For example, the interference threshold may be configured in memory 103 of the network node 102, by a configuration from network node 152 or other component of a wireless network, etc.

In another example, determining the subset of subframes to have the modified subframe structure at Block 202 may optionally be based on one or more determinations. For example, implementing the partial subframe structure in a subset of the subframes (e.g., as opposed to all subframes) can lessen impact of the modified subframe structure to legacy UEs (which may be unable to decode CRS where the first symbol is punctured), as opposed to implementing the partial subframe structure in all subframes. In another example, implementing the partial subframe structure in a subset of the subframes (e.g., as opposed to all subframes) can lessen impact of the modified subframe structure to throughput of communications by the network node 102 caused by puncturing one or more symbols in the first portion, etc.), as opposed to implementing the partial subframe structure in all subframes. Thus, communicating component 120 can communicate with network node 152 in remaining subframes that are not in the subset of subframes by using a conventional subframe structure (e.g., a subframe structure without symbols reserved for monitoring communications).

For example, determining the subset of subframes at Block 202 may optionally include, at Block 214, comparing a subframe configuration indicated in a SIB to a dynamic subframe configuration. For example, communicating component 120, e.g., in conjunction with processor(s) 106, memory 103, and/or transceiver 104, can determine the subset of subframes by comparing the subframe configuration indicated in the SIB to the dynamic subframe configuration. In one example, network node 102 can be an eNB that selects and indicates a TDD subframe configuration in a SIB, which can be received by network node 152 and used to coordinate communications between network nodes 102 and 152. In LTE, for example, the following TDD subframe configurations are defined:

| UL/DL configuration | DL-to-UL Switch Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D | where 'D' indicates downlink, 'U' indicates uplink, and 'S' indicates a special subframe that allows downlink communications and some period of time for switching to uplink communications. Thus, network node 102 may indicate a subframe configuration in SIB1, but may dynamically indicate another subframe configuration.

For example, in eIMTA, network node 102 may indicate a different TDD subframe configuration, than that configured in SIB1, based on actual traffic needs, and may indicate a switch to the new subframe configuration in control information transmitted to network node 152 and/or other network nodes. For example, communicating component 120 may advertise subframe configuration 1 (which includes 6 downlink subframes—including the special subframes—and 4 uplink subframes) in SIB1. However, communicating component 120 may determine that a large downlink data burst is needed for a short period of time, and may accordingly dynamically configure a frame to use subframe configuration 5 (which includes 9 downlink subframes and 1 uplink subframe). In addition, it is possible that other subframe configurations are used in this regard, such as:

| UL/DL configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 1' | D | D | D | D | D | D | D | D | D | D |
| 2' | D | S | D | D | D | D | D | D | D | D |
| 3' | U | U | U | U | U | U | U | U | U | U |

For example, in configuration 2', the special subframe may follow existing special subframe configurations or a new special subframe configuration. In any case, communicating component 120 can compare the subframe configuration indicated in SIB1 with the dynamic subframe configuration in eIMTA to determine the subset of subframes to include at least downlink subframes in the dynamic subframe configuration that are not downlink subframes in the subframe configuration indicated in SIB1. Thus, in the example above where SIB1 advertises subframe configuration 1 and eIMTA switches to subframe configuration 5, communicating component 120 can determine the subset of subframes for using the modified subframe structure as subframes 3, 7, and 8 (because subframes 3, 7, and 8 where designated for uplink in SIB1, but as downlink as a result of the eIMTA configuration). Dynamic subframe configuration switching in eIMTA may cause additional hybrid automatic repeat/request (HARQ) complexity, which can be simplified by using a reference subframe configuration (e.g., for uplink HARQ, scheduling and HARQ timing may be based on the SIB1 subframe configuration, whereas for downlink HARQ, a UE is indicated to use one reference configuration of 2, 4, or 5 in the table above).

In another example, network node 102 may indicate one or more subframes as MBSFN subframes. This can similarly be included in a dynamic subframe configuration by the network node (e.g., in control information, a subsequent SIB broadcasted by network node 102, etc.). Alternatively, this can be indicated in a semi-static configuration, e.g., via higher layer configuration. Communicating component 120 can similarly determine the downlink subframes that are indicated as MBSFN, and can determine the subset of subframes for implementing the modified subframe structure to be the downlink subframes configured as MBSFN. Thus, in an example, where the set of downlink subframes based on the DL/UL subframe configuration indicated in SIB1 are denoted as S_{DL, SIB1}, the set of downlink subframes not in SIB1, but indicated via eIMTA indicator (i.e., as potentially differing from the SIB1 configuration) are denoted as S_{DL, dynamic}, and the set of downlink subframes in S_{DL, dynamic} and indicated as MBSFN subframes are denoted as S_{DL, dynamic, MBSFN}, communicating component 120 can limit the subset of subframes for using the modified subframe structure to include the subframes in S_{DL, dynamic} or even more restrictive only in S_{DL, dynamic, MBSFN} (which may be indicated per radio frame or other collection of subframes).

For example, where network node 102 is a UE, communicating component 120 can similarly determine the subset of subframes based on SIB1 and/or the dynamic subframe configuration(s) (e.g., in eIMTA or MBSFN) received from the network node 152. The communicating component 120, in this regard and as explained above, can similarly determine subframes utilizing the modified subframe structure, for example.

In another example, determining the subset of subframes at Block 202 may optionally include, at Block 216, receiving a configuration indicating the subset of subframes. In an aspect, communicating component 120, e.g., in conjunction with processor(s) 106, memory 103, and/or transceiver 104, can receive the configuration indicating the subset of subframes (e.g., in radio resource control (RRC) signaling from the network node 152). By example, the configuration indicating the subset of subframes can be in the form of a pattern, bitmap, or an index to a set, list, or table. Such a pattern may be a repeating pattern that repeats over one or more frames or for a number of subframes. Alternatively, the pattern may be a non-repeating pattern, applicable only for a limited number of subframes or frames corresponding to the length of the pattern. For example, network node 152 may generate the configuration to include the subset of subframes, which can be determined as described above in comparing a SIB1 subframe configuration to a dynamic subframe configuration, and may transmit the configuration to the network node 102.

Moreover, in eIMTA, network node 102 may assign served network nodes (e.g., network node 152) to groups for configuring a dynamic subframe configuration. Thus, for example, network node 102 may assign legacy UEs (e.g., UEs that do not support the modified subframe structure) to one group and may assign UEs that support the modified subframe structure (e.g., network node 152) to another group. Communicating component 120 may indicate a dynamic subframe configuration to each group using layer 1 signaling over an EPDCCH common to the group. Communicating component 120 can accordingly utilize the modified subframe structure, as described, in the corresponding subset of subframes in communicating with UEs of the group that supports the modified subframe structure, while utilizing conventional subframe structures with the group that does not support the modified subframe structure (where each group may be configured with the same or different dynamic subframe configurations).

Figure 3:
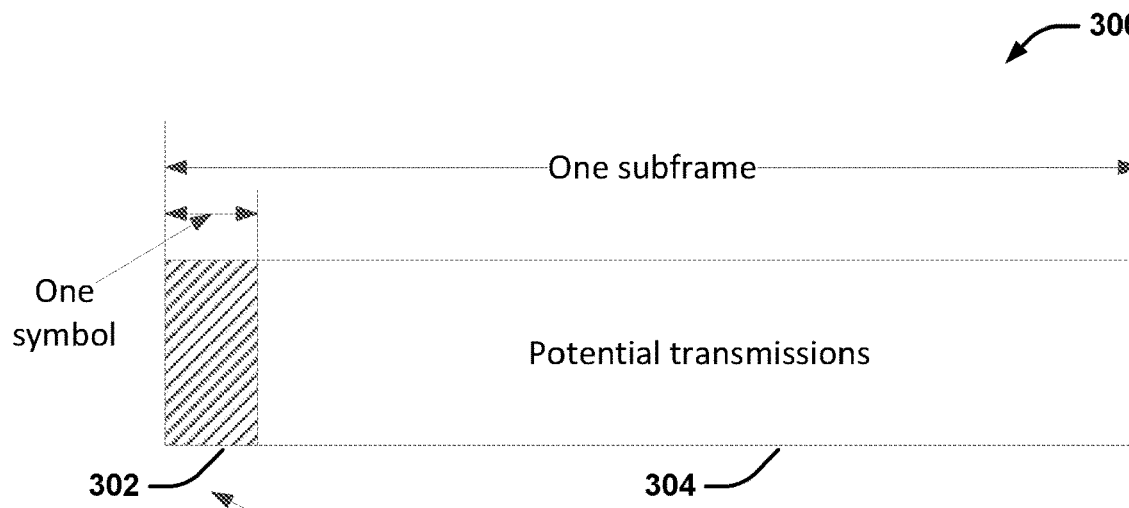
FIG. 3 illustrates examples of modified subframe structures in accordance with aspects described herein.
Figure 3:
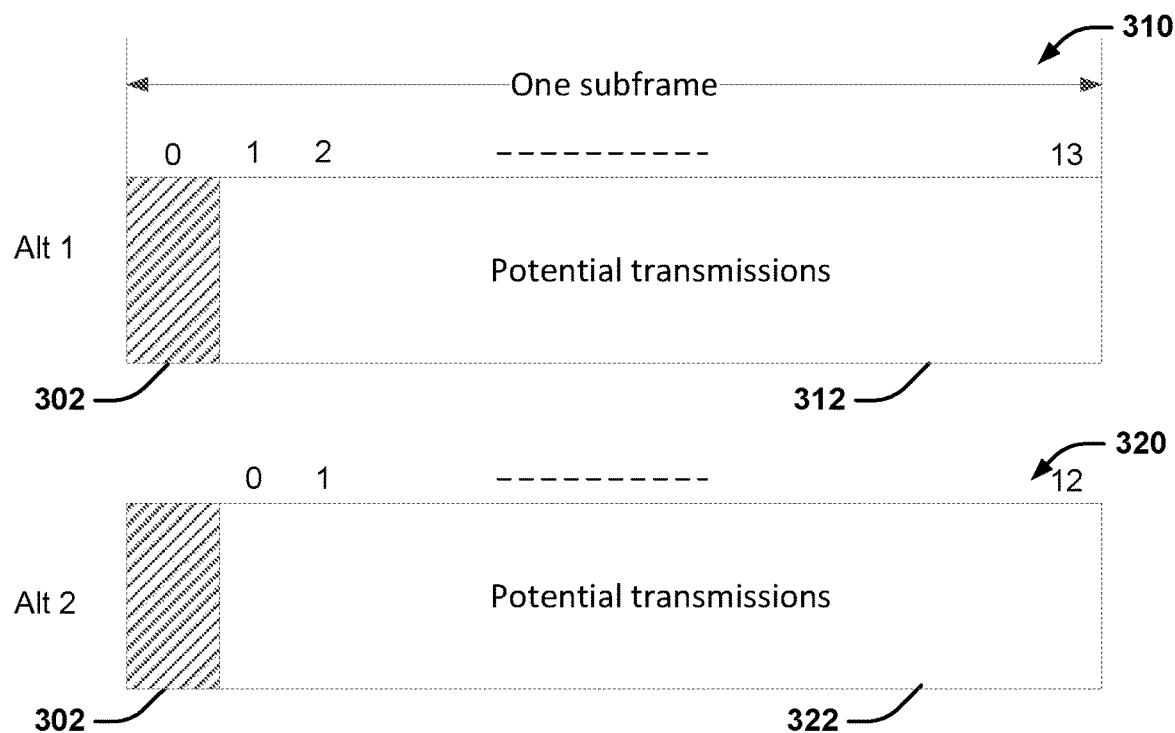

FIG. 3 illustrates examples of modified (subframe) structures 300, 310, 320 for the subset of subframes to allow for monitoring over a first portion and communicating over a second portion, as described above. Thus, for example, network nodes 102 and/or 152 can utilize one or more of the modified structures 300, 310, 320 in communicating over a determined subset of subframes. For example, modified structure 300 represents a subframe having the first portion as one symbol 302 over which an eNB (or UE) can perform sensing or monitoring for uplink (or downlink) transmissions related to a neighboring cell (e.g., from or to a neighboring node 150). Thus, this symbol 302 can be considered part of a limited number of downlink (or uplink) symbols in a subframe assumed to be unavailable for downlink (or uplink) control information and/or data transmissions. Modified structure 300 also includes a second portion 304 (including the remaining symbols of the subframe) over which the eNB (or UE) may or may not transmit downlink (or uplink) communications based on the sensing (e.g., an eNB can avoid transmitting downlink signals where uplink transmissions are sensed or downlink transmissions are not sensed in symbol 302, UE can avoid transmitting uplink signals where downlink transmissions are sensed or uplink transmissions are not sensed in symbol 302, etc.). For example, the network node 102 can stop downlink transmissions where it senses that there is uplink transmissions (e.g., that achieve an interference threshold signal power/quality) from a neighboring cell's UE. Similarly, where network node 102 is a UE, network node 102 can stop uplink transmissions where it senses that there is downlink transmissions (e.g., that achieve an interference threshold signal power/quality) from a neighboring cell intended for another UE.

Modified structure 310 represents a subframe having the first portion as one symbol 302, and the second portion 312 as remaining symbols over which transmissions may occur. Thus, this symbol 302 can be skipped for downlink (or uplink) control information and/or data transmissions. Structure 310 includes 14 symbols (indexed 0-13), as in an LTE subframe with normal cyclic prefix (CP) for example. For example, symbol 302 can be punctured to allow monitoring for wireless communications during the symbol. In this regard, the remaining symbols 1-13 are potentially transmitted. In an example, additional symbols may be punctured in this regard, and thus not transmitted while monitoring occurs. Puncturing symbols in this regard, for example, can maintain existing subframe structures and allow for scheduling legacy UEs in the subframe. Control channels in these subframes, however, may use realigned legacy PDCCH or may use EPDCCH if legacy control channels may not be supported due to the first one or more symbols being punctured. In addition, CRS may not be transmitted in the first portion or the entirety of each of the subset of subframes that use the modified structure 310.

Modified structure 320 represents a subframe having the first portion as one symbol 302, and the second portion 322 as remaining symbols over which transmissions may occur. Thus, this symbol 302 can be skipped for downlink (or uplink) control information and/or data transmissions. Structure 320 includes 14 symbols (indexed 0-13), as in an LTE subframe with normal cyclic prefix (CP) for example. For example, symbol 302 can be reserved for monitoring wireless communications in subframes using the modified structure 320, and the symbols for transmission can be shifted for transmission in the second portion 322 after the first symbol 302 (or one or more symbols). In this regard, symbols 0-12 are shifted to symbols 1-13 and potentially transmitted, and symbol 13 may be punctured as a result of being shifted past the edge of the subframe. Shifting the symbols in this regard can maintain legacy control regions (e.g., in symbols 1 and/or 2 as shifted by one symbol). In addition, CRS can be transmitted in symbol 0. However, a UE receiving such a modified subframe would need to be able to receive an indication of the shifted symbols or otherwise identify the modified subframe structure. DM-RS (and/or UE-RS), however, may not be transmitted as occurring in punctured symbol 13, and thus a different DM-RS (and/or UE-RS) pattern may be used (e.g., the DM-RS pattern for DwPTS).

Figure 4:
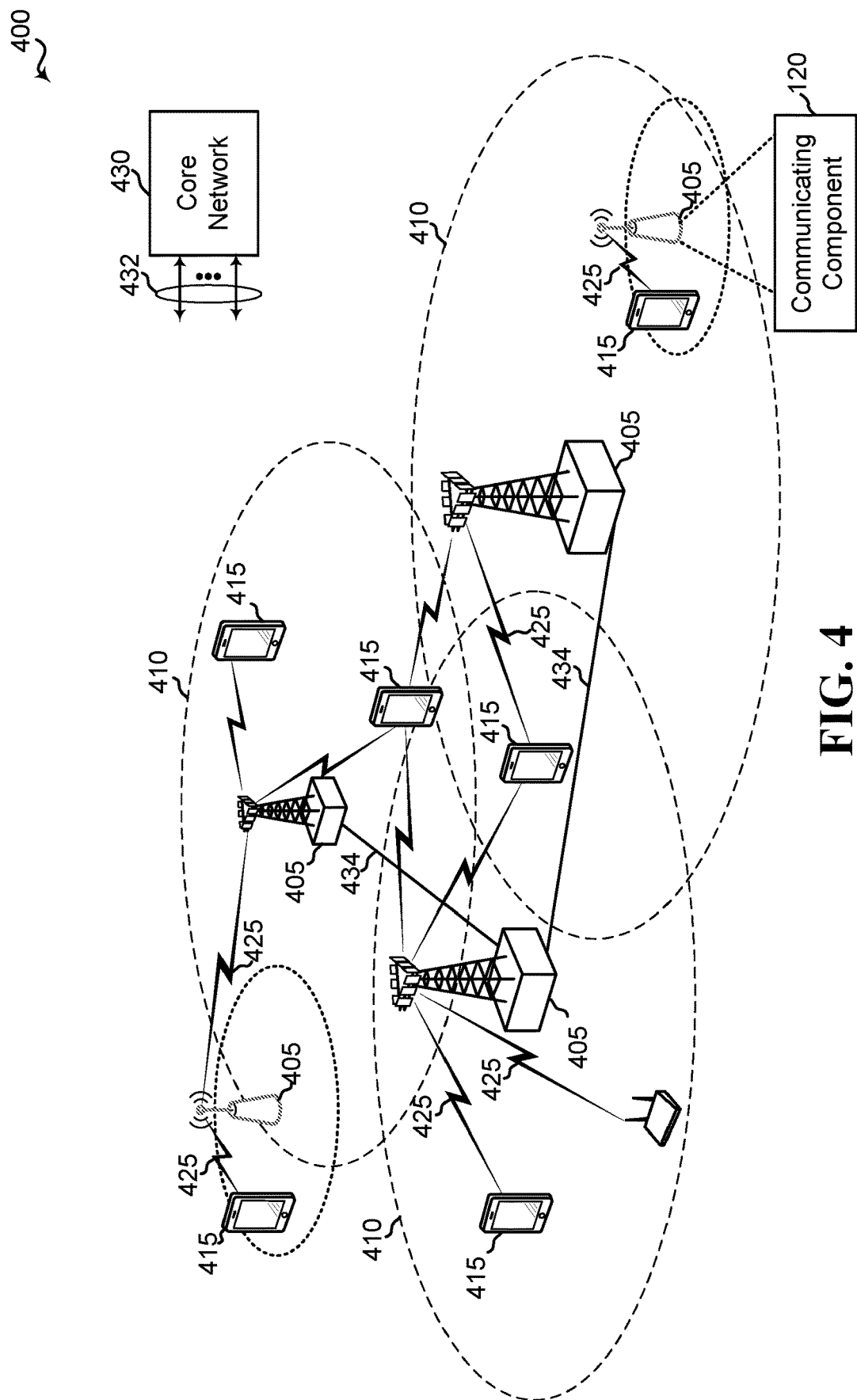
FIG. 4 shows a block diagram conceptually illustrating an example of a telecommunications system, in accordance with aspects described herein.

FIG. 4 is a diagram illustrates an example of a wireless communications system 400, in accordance with aspects described herein. The wireless communications system 400 includes a plurality of access points (e.g., base stations, eNBs, or WLAN access points) 405, a number of user equipment (UEs) 415, and a core network 430. For example, access points 405 and/or UEs 415 may be examples of network nodes 102, 152, neighboring node 150, etc. in FIG. 1. Access points 405 may include a communicating component 120 configured to communicate according to a modified subframe configuration, monitor communications from other access points 405, determine a subframe configuration for communicating with one or more other nodes, etc., in accordance with aspects described herein. Though shown as employed by an access point 405, substantially any wireless communication device (e.g., another small cell or macro access point 405, UE 415, etc.) may include and/or execute functions associated with a communicating component 120, as described herein.

Some of the access points 405 may communicate with the UEs 415 under the control of a base station controller (not shown), which may be part of the core network 430 or the certain access points 405 (e.g., base stations or eNBs) in various examples. Access points 405 may communicate control information and/or user data with the core network 430 through backhaul links 432. In examples, the access points 405 may communicate, either directly or indirectly, with each other over backhaul links 434, which may be wired or wireless communication links. The wireless communications system 400 may support operation on multiple carriers (waveform signals of different frequencies). Multi-carrier transmitters can transmit modulated signals simultaneously on the multiple carriers. For example, each communication link 425 may be a multi-carrier signal modulated according to the various radio technologies described above. Each modulated signal may be sent on a different carrier and may carry control information (e.g., reference signals, control channels, etc.), overhead information, data, etc.

The access points 405 may wirelessly communicate with the UEs 415 via one or more access point antennas. Each of the access points 405 sites may provide communication coverage for a respective coverage area 410. In some examples, access points 405 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 410 for a base station may be divided into sectors making up only a portion of the coverage area (not shown). The wireless communications system 400 may include access points 405 of different types (e.g., macro, micro, femto, and/or pico base stations). The access points 405 may also utilize different radio technologies, such as cellular and/or WLAN radio access technologies (RAT). The access points 405 may be associated with the same or different access networks or operator deployments. The coverage areas of different access points 405, including the coverage areas of the same or different types of access points 405, utilizing the same or different radio technologies, and/or belonging to the same or different access networks, may overlap.

In LTE/LTE-A network communication systems, the terms evolved Node B (eNodeB or eNB) may be generally used to describe the access points 405. The wireless communications system 400 may be a Heterogeneous LTE/LTE-A network in which different types of access points provide coverage for various geographical regions. For example, each access point 405 may provide communication coverage for a macro cell, a pico cell, a femto cell, and/or other types of cell. Small cells such as pico cells, femto cells, and/or other types of cells may be provided by small cell base stations as low power nodes or LPNs. A macro cell may generally cover a relatively large geographic area (e.g., several kilometers in radius) and may allow unrestricted access by UEs 415 with service subscriptions with the network provider. A small cell may generally cover a relatively smaller geographic area and may allow unrestricted access by UEs 415 with service subscriptions with the network provider, for example, and in addition to unrestricted access, may also provide restricted access by UEs 415 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 430 may communicate with the eNBs or other access points 405 via one or more backhaul links 432 (e.g., S1 interface, etc.). The access points 405 may also communicate with one another, e.g., directly or indirectly via backhaul links 434 (e.g., X2 interface, etc.) and/or via backhaul links 432 (e.g., through core network 430). The wireless communications system 400 may support synchronous or asynchronous operation. For synchronous operation, the access points 405 may have similar frame timing, and transmissions from different access points 405 may be approximately aligned in time. For asynchronous operation, the access points 405 may have different frame timing, and transmissions from different access points 405 may not be aligned in time.

The UEs 415 are dispersed throughout the wireless communications system 400, and each UE 415 may be stationary or mobile. A UE 415 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, a station, an access terminal, a mobile terminal, a wireless terminal, a remote terminal, a handset, a user agent, a mobile client, a client, or some other suitable terminology. A UE 415 may be a cellular phone, a smart phone, a personal digital assistant (PDA), a wireless modem, a wireless communication device, a handheld device, a tablet computer, a laptop computer, a netbook, a smartbook, an ultrabook, a drone, a robot/robotic device, a cordless phone, a wearable item (such as a watch, glasses, bracelets, rings, wristbands, clothing, etc.), an entertainment device (e.g., music device, gaming device), cameras, monitors, meters, trackers, medical devices, vehicular devices, a wireless local loop (WLL) station, or the like. A UE 415 may be able to communicate with macro eNBs, small cell eNBs, relays, and the like. A UE 415 may also be able to communicate over different access networks, such as cellular or other WWAN access networks, or WLAN access networks.

The communication links 425 shown in wireless communications system 400 may include uplink (UL) transmissions from a UE 415 to an access point 405, and/or downlink (DL) transmissions, from an access point 405 to a UE 415. The downlink transmissions may also be called forward link transmissions while the uplink transmissions may also be called reverse link transmissions. The communication links 425 may carry transmissions of one or more hierarchical layers which, in some examples, may be multiplexed in the communication links 425. The UEs 415 may be configured to collaboratively communicate with multiple access points 405 through, for example, Multiple Input Multiple Output (MIMO), carrier aggregation (CA), Coordinated Multi-Point (CoMP), multiple connectivity (e.g., CA with each of one or more access points 405) or other schemes. MIMO techniques use multiple antennas on the access points 405 and/or multiple antennas on the UEs 415 to transmit multiple data streams. Carrier aggregation may utilize two or more component carriers on a same or different serving cell for data transmission. CoMP may include techniques for coordination of transmission and reception by a number of access points 405 to improve overall transmission quality for UEs 415 as well as increasing network and spectrum utilization.

Each of the different operating modes that may be employed by wireless communications system 400 may operate according to frequency division duplexing (FDD) or time division duplexing (TDD). In some examples, OFDMA communications signals may be used in the communication links 425 for LTE downlink transmissions for each hierarchical layer, while single carrier frequency division multiple access (SC-FDMA) communications signals may be used in the communication links 425 for LTE uplink transmissions.

Figure 5:
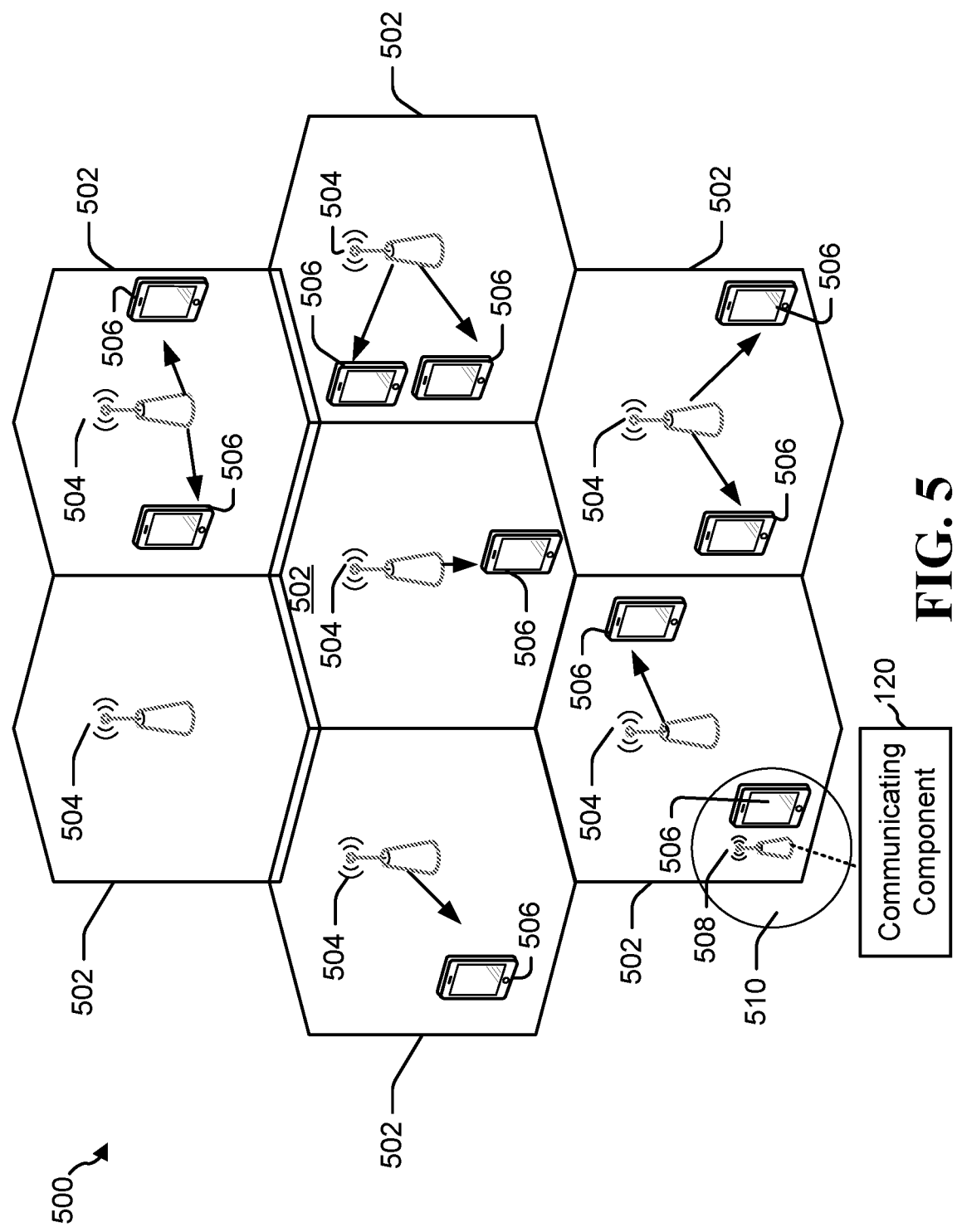
FIG. 5 is a diagram illustrating an example of an access network.

FIG. 5 is a diagram illustrating an example of an access network 500 in an LTE network architecture. In this example, the access network 500 is divided into a number of cellular regions (cells) 502. One or more small cell eNBs 508 (e.g., eNBs of a lower power class than eNBs 504) may have cellular regions 510 that overlap with one or more of the cells 502. The small cell eNB 508 may be, for example, a femto cell (e.g., home eNB (HeNB)), pico cell, micro cell, or remote radio head (RRH), etc.). The macro eNBs 504 are each assigned to a respective cell 502 and are configured to provide an access point to the core network 130 for all the UEs 506 in the cells 502. In an example, eNBs 504, 508 and/or UEs 506 may be examples of network nodes 102, 152, neighboring node 150, etc. in FIG. 1. Small cell eNB 508 can include a communicating component 120 configured to communicate according to a modified subframe configuration, monitor communications from other access points 405, determine a subframe configuration for communicating with one or more other nodes, etc., in accordance with aspects described herein. Though shown as employed by a small cell eNB 508, substantially any wireless communication device (e.g., another small cell eNB or macro eNB 504, UE 506, etc.) may execute a communicating component 120. There is no centralized controller shown in this example of an access network 500, but a centralized controller may be used in alternative configurations. The eNBs 504 and/or 508 may be responsible for all radio related functions including radio bearer control, admission control, mobility control, scheduling, security, and connectivity to a serving gateway (not shown).

The modulation and multiple access scheme employed by the access network 500 may vary depending on the particular telecommunications standard being deployed. In LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 504 and/or 508 may have multiple antennas supporting MIMO technology. The use of MIMO technology enables the eNBs 504 and/or 508 to exploit the spatial domain to support spatial multiplexing, beamforming, and transmit diversity. Spatial multiplexing may be used to transmit different streams of data simultaneously on the same frequency. The data steams may be transmitted to a single UE 506 to increase the data rate or to multiple UEs 506 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 506 with different spatial signatures, which enables each of the UE(s) 506 to recover the one or more data streams destined for that UE 506. On the UL, each UE 506 transmits a spatially precoded data stream, which enables the eNB 504 and/or 508 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 6:
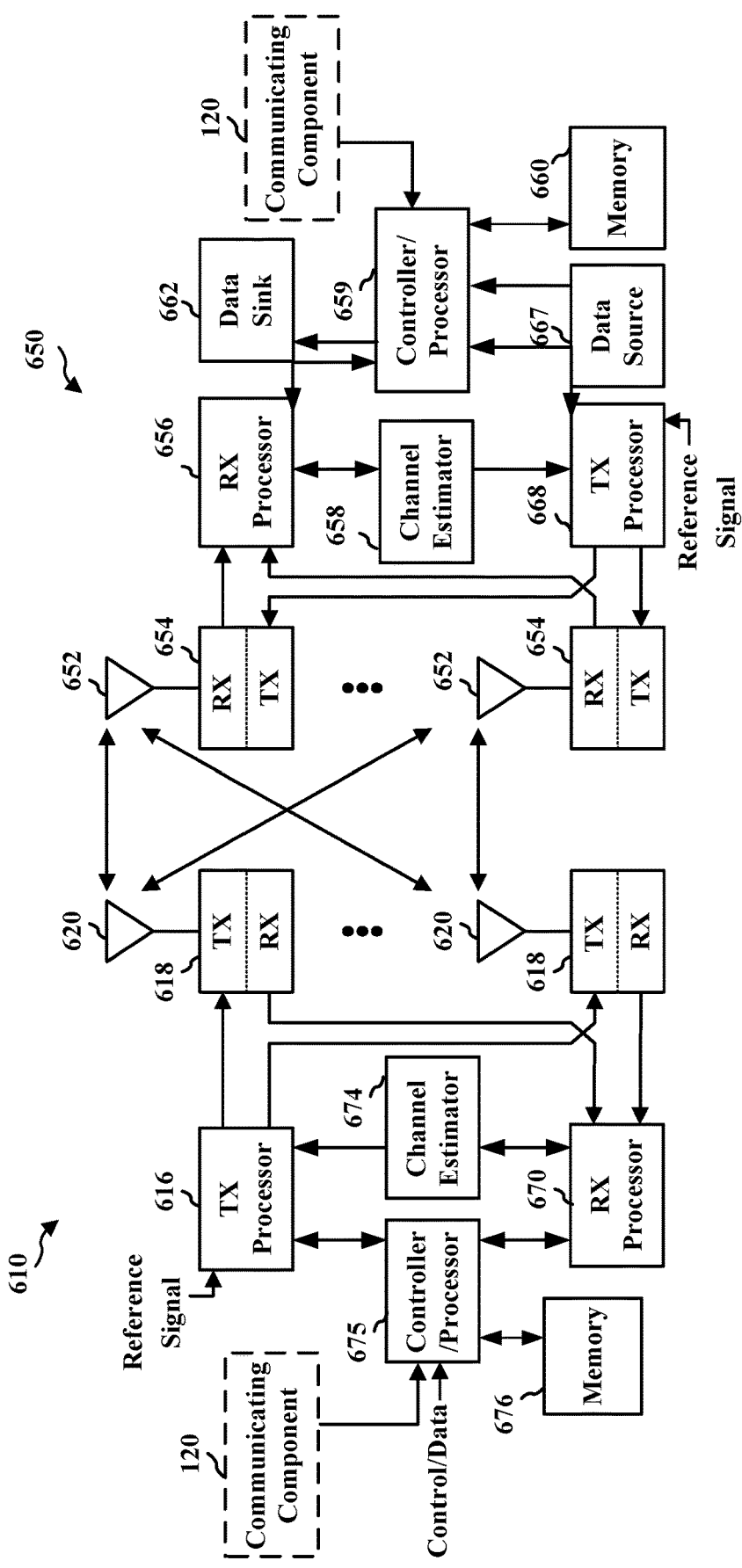
FIG. 6 is a diagram illustrating an example of an evolved Node B and user equipment in an access network.

FIG. 6 is a block diagram of an eNB 610 in communication with a UE 650 in an access network. In an example, eNB 610 and/or UE 650 may be examples of network nodes 102, 152, neighboring node 150, etc. in FIG. 1. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission. In addition, eNB 610 may include communicating component 120 configured to communicate according to a modified subframe configuration, monitor communications from other access points or UEs, determine a subframe configuration for communicating with one or more other nodes, etc., in accordance with aspects described herein. Though shown as employed by an eNB 610, substantially any wireless communication device (e.g., another eNB, UE 650, etc.) may execute a communicating component 120, as described herein. For example, communicating component 120 can be implemented and/or executed by one or more processors, such as TX processor 616, RX processor 670, controller/processor 675, etc.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. The controller/processor 659 and/or other controllers and/or modules at UE 650 may direct operations of various techniques described herein (e.g., operations in connection with FIG. 2). In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 layer processing. The controller/processor 659 is also responsible for error detection using an acknowledgement (ACK) and/or negative acknowledgement (NACK) protocol to support HARQ operations. In addition, UE 650 may include communicating component 120 configured to communicate according to a modified subframe configuration, monitor communications from other UEs or access points, determine a subframe configuration for communicating with one or more other nodes, etc., in accordance with aspects described herein. For example, communicating component 120 can be implemented and/or executed by one or more processors, such as RX processor 656, controller/processor 659, TX processor 668, etc.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. The controller/processor 675 and/or other controllers and/or modules at eNB 610 may direct operations of various techniques described herein (e.g., operations in connection with FIG. 2). In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for determining a modified subframe structure in wireless communications in a first node, comprising:
    determining a subset of subframes, in a plurality of subframes, associated with the modified subframe structure, wherein the modified subframe structure includes a first portion with one or more blank symbols and a second portion of symbols for communicating at least one of control information or data, wherein determining the subset of subframes comprises comparing an indicated subframe configuration indicated in a system information block (SIB), to a dynamic subframe configuration; and
    communicating control information or data with a second node based on the modified subframe structure using at least one subframe in the subset of subframes.

2. The method of claim 1, further comprising:
    monitoring wireless communications received, at the first node, from one or more neighboring nodes during the first portion of each of the subset of subframes.

3. The method of claim 2, wherein the monitoring comprises monitoring an adjacent frequency channel that is adjacent in frequency to a serving frequency channel over which the control information or data is communicated.

4. The method of claim 2, further comprising:
    determining a neighboring subframe configuration of the one or more neighboring nodes, during the at least one subframe, based at least in part on the wireless communications received during the first portion of the at least one subframe,
    wherein communicating with the second node comprises performing at least one of uplink or downlink wireless communications with the second node during the second portion of symbols of the at least one subframe based on determining the neighboring subframe configuration.

5. The method of claim 1, wherein the one or more blank symbols in the first portion of the subset of subframes are generated by puncturing one or more symbols scheduled in the first portion of each of the subset of subframes.

6. The method of claim 5, wherein the first portion of each of the subset of subframes comprises a first symbol of each of the subset of subframes.

7. The method of claim 6, wherein communicating with the second node comprises communicating the control information based on a control channel scheduled in the second portion of symbols of the at least one subframe.

8. The method of claim 1, wherein communicating with the second node comprises communicating, by an evolved Node B (eNB), with a user equipment (UE) during the second portion of symbols of the at least one subframe based at least in part on determining that a neighboring subframe configuration of one or more neighboring nodes is configured for downlink communications.

9. The method of claim 1, wherein communicating with the second node comprises communicating, by a user equipment (UE), with an evolved Node B (eNB) over the second portion of symbols of the at least one subframe based at least in part on determining that a neighboring subframe configuration of one or more neighboring nodes is configured for uplink communications.

10. The method of claim 9, further comprising monitoring wireless communications received, at the first node, from one or more neighboring nodes for a duration of a timing gap, and wherein communicating with the eNB over the second portion of symbols of the at least one subframe is based at least in part on monitoring wireless communications during the timing gap.

11. The method of claim 9, wherein communicating with the eNB over the second portion of symbols of the at least one subframe is based at least in part on determining that the wireless communications received from one or more neighboring nodes do not achieve an interference threshold.

12. The method of claim 1, wherein communicating with the second node comprises shifting communications scheduled in the at least one subframe to begin after the first portion of the at least one subframe.

13. The method of claim 1, wherein the first portion comprises a first symbol of the at least one subframe, and wherein communicating with the second node comprises shifting, by an evolved Node B (eNB) communications with a user equipment (UE) to begin after the first symbol of the at least one subframe, including transmitting a cell-specific reference signal in a second symbol of the at least one subframe.

14. The method of claim 1, wherein determining the subset of subframes is based at least in part on comparing the indicated subframe configuration indicated in the SIB to the dynamic subframe configuration indicated in an enhanced interference mitigation and traffic adaptation (eIMTA) configuration.

15. The method of claim 1, wherein determining the subset of subframes is based at least in part on comparing the indicated subframe configuration indicated in the SIB to the dynamic subframe configuration indicated in a multicast-broadcast single-frequency network (MBSFN) configuration.

16. The method of claim 1, wherein determining the subset of subframes is based at least in part on receiving, from a network node, a configuration indicating the subset of subframes.

17. An apparatus for determining modified a subframe structure in wireless communications in a first node, comprising:
a transceiver;
one or more antennas;
at least one processor communicatively coupled with the transceiver via a bus for communicating signals in a wireless network via the one or more antennas; and
a memory communicatively coupled with the at least one processor and/or the transceiver via the bus;
wherein the at least one processor is configured to:
determine a subset of subframes, in a plurality of subframes, associated with the modified subframe structure, wherein the modified subframe structure includes a first portion with one or more blank symbols and a second portion of symbols for communicating at least one of control information or data wherein determining the subset of subframes comprises comparing an indicated subframe configuration indicated in a system information block (SIB), to a dynamic subframe configuration; and
communicate, via the transceiver, control information or data with a second node based on the modified subframe structure using at least one subframe in the subset of subframes.

18. The apparatus of claim 17, wherein the at least one processor is further configured to:
monitor wireless communications received, at the first node, from one or more neighboring nodes during the first portion of each of the subset of subframes.

19. The apparatus of claim 18, wherein the at least one processor is configured to monitor an adjacent frequency channel that is adjacent in frequency to a serving frequency channel over which the control information or data is communicated for the wireless communications received at the first node.

20. The apparatus of claim 18, wherein the at least one processor is further configured to:
determine a neighboring subframe configuration of the one or more neighboring nodes, during the at least one subframe, based at least in part on the wireless communications received during the first portion of the at least one subframe,
wherein the at least one processor is configured to communicate with the second node by performing at least one of uplink or downlink wireless communications with the second node during the second portion of symbols of the at least one subframe based on determining the neighboring subframe configuration.

21. The apparatus of claim 17, wherein the one or more blank symbols in the first portion of the subset of subframes are generated by puncturing one or more symbols scheduled in the first portion of each of the subset of subframes.

22. The apparatus of claim 17, wherein the at least one processor is configured to communicate with the second node by shifting communications scheduled in the at least one subframe to begin after the first portion of the at least one subframe.

23. The apparatus of claim 17, wherein the at least one processor is configured to determine the subset of subframes based at least in part on comparing the indicated subframe configuration indicated in the SIB to the dynamic subframe configuration indicated in an enhanced interference mitigation and traffic adaptation (eIMTA) configuration.

24. The apparatus of claim 17, wherein the at least one processor is configured to determine the subset of subframes based at least in part on comparing the indicated subframe configuration indicated in the SIB to the dyanmic subframe configuration indicated in a multicast-broadcast single-frequency network (MBSFN) configuration.

25. An apparatus for determining a modified subframe structure in wireless communications in a first node, comprising:
means for determining a subset of subframes, in a plurality of subframes, associated with the modified subframe structure, wherein the modified subframe structure includes a first portion with one or more blank symbols and a second portion of symbols for communicating at least one of control information or data wherein the means for determining the subset of subframes comprises means for comparing an indicated subframe configuration indicated in a system information block (SIB), to a dynamic subframe configuration; and means for communicating control information or data with a second node based on the modified subframe structure using at least one subframe in the subset of subframes.

26. The apparatus of claim 25, further comprising means for monitoring wireless communications received, at the first node, from one or more neighboring nodes during the first portion of each of the subset of subframes.

27. The apparatus of claim 26, wherein the means for monitoring monitors an adjacent frequency channel that is adjacent in frequency to a serving frequency channel over which the control information or data is communicated for the wireless communications received at the first node.

28. A non-transitory computer-readable storage medium comprising computer-executable code for determining a modified subframe structure in wireless communications in a first node, the code comprising:

code for determining a subset of subframes, in a plurality of subframes, associated with the modified subframe structure, wherein the modified subframe structure includes a first portion with one or more blank symbols and a second portion of symbols for communicating at least one of control information or data wherein determining the subset of subframes comprises code for comparing an indicated subframe configuration indicated in a system information block (SIB), to a dynamic subframe configuration; and code for communicating control information or data with a second node based on the modified subframe structure using at least one subframe in the subset of subframes.

29. The non-transitory computer-readable storage medium of claim 28, further comprising code for monitoring wireless communications received, at the first node, from one or more neighboring nodes during the first portion of each of the subset of subframes.

30. The non-transitory computer-readable storage medium of claim 29, wherein the code for monitoring monitors an adjacent frequency channel that is adjacent in frequency to a serving frequency channel over which the control information or data is communicated for the wireless communications received at the first node.

* * * * *